United States Patent Office 2,755,887
Patented July 24, 1956

2,755,887

MELAMINE PURIFICATION

Leslie G. Boatright, Stamford, Conn., assignor to American Cyanamid Company, New York, N. Y., a corporation of Maine No Drawing. Application June 15, 1954,
Serial No. 437,005

10 Claims. (Cl. 183—120)

This invention relates to melamine and more particularly it relates to a novel process of recovering substantially pure solid melamine from a vapor stream comprising melamine vapor and impurities.

One of the outstanding problems in the production of melamine is the necessity for purification of the melamine-containing product obtained from the melamine-making apparatus. Crude melamine fractions usually contain impurities such as ammeline, ammelide, melam and melon which are so similar in many respects to melamine itself, chemically speaking that separation of melamine therefrom by chemical means has always been a very difficult process. In the urea-to-melamine process, the vapor stream coming out of the reactor and carrying melamine and other impurities all in the vapor state has always presented a difficult problem of purification.

Probably the most commonly encountered method to separate a pure melamine product from its impurities is the use of a caustic crystallization. In this method, impure melamine is dissolved in water containing caustic soda. In order that the melamine may be dissolved to a practical extent the dissolving process is usually carried out at elevated temperature, often about 125°–150° C. Resultant hot caustic liquor is then clarified if necessary as by a decantation or filtration and the clarified solution is cooled to about room temperature. Under these conditions melamine can be crystallized as a substantially pure product.

Although the above process has been widely used in the past, it is burdened with several disadvantages. Some melamine is converted to soluble impurities by the caustic solution and some stays in solution even after the solution has been cooled; this residual solubility causes the loss of some melamine. Not the least of the problem is the requisite use of elevated temperatures and pressures in order to operate at economical efficiency.

It is an object of the present invention to recover solid substantially pure melamine by physical means. It is a further object to recover substantially pure solid melamine from a vapor stream comprising melamine vapor and impurities.

These objects are accomplished in a straightforward manner. A vapor stream comprising melamine vapor and impurities in the vapor state is treated so that at least a portion of the vapor stream is cooled to a temperature in the range of about 180°–356° C. Solid substantially pure melamine resulting from the cooling step is then recovered.

The source of the vapor stream containing melamine vapor and impurities in the vapor state forms no part of the present invention. The vapor stream may originate from a continuous or batch melamine reactor. Alternatively the vapor stream may be formed by vaporizing crude melamine along with its impurities once solid crude melamine has been prepared by any of the well-known methods. It is only necessary that the vapor stream contain melamine vapor along with vaporized impurities from which it is desired to separate solid substantially pure melamine.

At least a portion of the above-described vapor stream must now be cooled to a temperature in the range of about 180°–356° C. This cooling causes the formation of substantially pure solid melamine. This desublimed melamine may then be recovered by any convenient means depending on the process by which the cooling was carried out.

Since there are several means by which the cooling may be carried out the precise cooling process may be selected from those available depending on such factors as the amount of melamine to be recovered, the availability of various equipment, the type of impurity in the melamine-containing vapor stream, and the pressure at which the desublimation is to be conducted.

One method of carrying out the cooling is to pass the vapor stream into a condenser or desublimer the walls of which are maintained at a temperature sufficient to cool the vapor stream to a temperature in the range of 180°–356° C. The desublimer may be equipped with scrapers to remove solid melamine from the walls. The solid melamine may then be collected in a hopper at the bottom of the desublimer and utilized as desired. In an apparatus of this sort substantial portions of the incoming vapor stream do not reach the desired temperature range of 180°–356° C.; only a portion of the vapor stream will reach this temperature. The remaining portion may be passed to a second desublimer or it may be treated so as to condense out all condensable materials therein, and these materials may be worked up to recover melamine by conventional methods.

The vapor stream may also be cooled by direct contact with a gas, liquid or solid cooling medium.

If a gas is to be used as the cooling medium, the vapor stream and the gas are then blended in such proportion as to result in a final mixture temperature within the range of about 180°–356° C. The gas temperature will determine how large a volume of the gas should be blended with a given volume of the incoming vapor stream in order that the requisite temperature range be reached. The gas should be inert to melamine in order that deleterious side reactions do not take place. As examples of suitable gases there may be mentioned air, ammonia, nitrogen, or ammonium carbamate vapor. The apparatus in which the mixing takes place may be any convenient apparatus such as a vessel or column. The apparatus should be equipped so as to collect the substantially pure solid melamine that crystallizes out of the vapor stream. This may readily be accomplished by the installation of bag filters or by the use of separate settling chambers in which the gas has a very low velocity.

Should it be desired to use a liquid as the cooling medium then it is preferred to use the high boiling inert hydrocarbon fractions. The vapor stream may be passed counter-current to the inert liquid resulting in a mixture having a temperature in the range of about 180°–356° C. The liquid coolant may be employed as a film flowing downward on the inside walls of the tubes in a heat exchanger with the hot gas flowing upward inside the liquid films. Water will be outside the tubes. The substantially pure solid melamine crystallizing in or on the liquid may be removed as by filtration or otherwise. The mother liquor may then pass through a heat exchanger in order that its temperature may be adjusted for another pass through the apparatus in which the vapor stream is contacted with the liquid stream.

Should a solid be used as the cooling medium several alternative methods of materials-handling are available. The solid may be maintained at a temperature in the range of about 180°–356° C. A vapor stream comprising melamine vapor and impurities in the vapor state may then be passed into contact with the solid. Substantially pure melamine deposits on the solid. Melamine may be recovered from the solid by any convenient means as by washing. For example a bed of pebbles may be circulated through the hot gases and recooled by air or other medium in a separate kiln or tower. Alternatively, two towers may be used cyclically, one being washed down and cooled while the other is in contact with the melamine-containing gases, both having immovable fixed packing. The solid may be any inert solid which does not react with either melamine or any impurities in the vapor stream.

As examples of the solid there may be mentioned sand, pebbles, brick, any of the silica gels, and solid melamine itself. Preferably the solid should be of a size so as to render it easy to handle depending on the precise method of contacting the solid and the vapor stream. If the solid bed is to be stationary, then it may consist of continuous packing or brickwork. If the solid bed is to be fluidized then the solid material should be ground appreciably finer, as for example about 70% in the range of about 100–200 mesh.

The preferable method of carrying out the process of the present invention is by the use of solid melamine as the cooling medium. The solid melamine should be in a size range of about 70% through 100–200 mesh and is maintained at a temperature in the range of about 180°–356° C. by withdrawing portions of the melamine cooling medium, cooling these portions and recycling them to the vessel in which the cooling step is carried out. Thus, the melamine in the incoming vapor stream crystallizes on the mass of melamine that serves as a cooling medium. The solid melamine cooling medium may be maintained in the fluidized state by the melamine-containing stream itself or by the admission of an inert gas such as ammonia, nitrogen, air, or ammonium carbamate vapor heated to the proper temperature and admitted in such quantity as to maintain the cooling medium bed in a fluidized state. Sufficient of the cooling medium bed must be cooled as by maintaining external cooling on the walls of the contacting zone, or otherwise in order that incoming vapor stream may be cooled to a temperature in the range of about 180°–356° C. Since the condensing melamine is constantly adding to the size and volume of the melamine bed used as a cooling medium it is a simple matter to split off a product stream of melamine from that melamine which recycles to the cooling step. Thus the entire cycle may consist simply of passing in a vapor stream comprising melamine vapor and impurities so as to contact a bed of melamine, removing a portion of the bed, splitting the removed portion into two streams, one of which is the product and the other of which is cooled and recycled to the contacting step.

The temperature range to which at least a portion of the vapor stream must be cooled is critical. The upper limit of 356° C. is the temperature at which melamine melts. The formation of liquid melamine is deleterious since it causes the entrainment of impurity laden gases. It also presents a problem of handling sticky and wet materials should the temperature rise above 356° C. Also, molten melamine is unstable giving off $NH_3$ and forming condensed triazines such as melam, melem, and melon. Also the presence of impurities may reduce the melting point of below 356° C.

The lower limit is 180° C. At temperatures below this lower limit undue quantities of impurities condense out of the vapor stream along with the melamine. At a temperature of 175° C. a vapor stream containing melamine and vaporized urea will deposit a solid containing only about 97% melamine. At 178° C. the purity of the product has risen to 98.5% melamine; this is still insufficiently pure for the melamine to be used as is, it must be further treated to purify it. At about 179° C. the purity of the melamine runs about 98.5–98.8. At a temperature of about 180° C. for the first time it is possible to recover melamine of greater than 99% purity; this melamine may be used directly without further purification.

The total pressure on the cooling step has little or no influence on the process of the present invention. Even though the total pressure will influence the partial pressures of the various materials in the vapor stream these partial pressures are all affected the same way and thus there is always enrichment in melamine.

It is one of the advantages of the present invention that melamine is obtained in an extremely pure state in crystalline form having a high apparent density. This can be accomplished regardless of the source of the melamine and even when the vapor stream containing melamine vapor is accompanied with the vapors of such impurities as cyanic or isocyanic acid, $NH_3$ and $CS_2$, cyanuric acid, $NH_3$ and $CO_2$, $NH_3$ and $CO$, cyanomelamine, etc.

It must be pointed out that not all the melamine in the vapor stream will condense out at a temperature in the critical range of 180–356° C. Whatever melamine fails to condense in the described temperature range may be collected at lower temperatures as for example temperatures in the range of 60°–100° C. It is preferred to use temperatures over 65° C. to prevent deposition of ammonium carbamate. This crude melamine collected at lower temperatures can be purified by a recycle sublimation followed by the high temperature condensation as taught by the process of the present invention. Should it be desired, the crude melamine may be purified by recrystallization or other standard means. In order to minimize the amount of melamine failing to condense during the high temperature condensation, it is preferred to maintain a temperature in the range of about 200–275° C. It is in this temperature range that there is obtained the optimum amount of extremely pure solid melamine with a minimum amount of melamine passing through to be collected in a low temperature collection system.

The following examples are illustrative of the process of the present invention. All parts are by weight.

*Example 1*

A stream of vapor containing melamine in the vapor state, is removed from the urea-to-melamine reactor at a temperature of 400° C. and is passed through a steam jacketed single tube condenser equipped with a hand scraper for removing solids from the walls. The vapor stream entered tangentially and the off gases are disposed of simply by bubbling them through a large volume of water. At the end of 10 minutes there has been collected 26 parts of dense crystalline melamine having a purity of 99.8%.

*Example 2*

Into a vertical 2″ glass tube is placed 390 gms. of solid substantially pure melamine. The melamine has been sized so that 80% passes through 100 mesh. By means of a gas inlet tube at the bottom of the vertical tube a vapor stream comprising melamine (92% by weight) and other impurities is admitted to the bottom. The rate of inlet, about 40 liters per minute at 400° C. was sufficient to agitate slightly the melamine cooling medium.

After 15 minutes the volume of the melamine cooling medium had increased to 35 cubic inches thus enabling the solid melamine to overflow out a side arm on the vertical tube. About half of the melamine that overflows is returned to the vertical tube near the bottom by entraining the melamine in a stream of ammonia. The half of the overflowing stream removed as product consisted of 99.8+% pure melamine.

The temperature of the gases near the top of the solid melamine cooling agent over a 4 hour period remained between 220°–225° C. once equilibrium is reached.

I claim:

1. The process of recovering substantially pure solid melamine from a vapor stream issuing from a urea-to-melamine reactor comprising melamine vapor and impurities which comprises atmospherically cooling at least a portion of said vapor stream to a temperature in the range of about 180°–356° C., and recovering so-produced solid melamine.

2. The process according to claim 1 wherein said temperature is in the range of about 200–275° C.

3. The process according to claim 1 wherein said cooling is carried out by contacting said vapor stream with an inert gas stream.

4. The process according to claim 1 wherein said cooling is carried out by contacting said vapor stream with an inert liquid stream.

5. The process according to claim 1 wherein said cooling is carried out by contacting said vapor stream with inert solids.

6. The process of recovering substantially pure solid melamine from a vapor stream issuing from a urea-to-melamine reactor comprising melamine vapor and impurities which comprises atmospherically contacting said vapor stream with a cooling medium to cool at least a portion of said vapor stream to a temperature in the range of about 180°–356° C., recovering so-produced substantially pure solid melamine, and cooling off gases from said contacting step to a temperature in the range of about 60°–100° C. to recover crude melamine therefrom.

7. The process of recovering substantially pure solid melamine from a vapor stream issuing from a urea-to-melamine reactor comprising melamine vapor and impurities which comprises atmospherically passing said vapor stream through a fluidized bed of solid melamine, maintaining the cooler portion of said bed at a temperature in the range of about 180°–356° C., removing a portion of said fluidized bed, recovering product melamine from said removed portion, and recycling the remaining portion of said removed portion to said fluidized bed.

8. The process according to claim 7 wherein said temperature is in the range of about 200°–275° C.

9. The process of recovering substantially pure solid melamine from a vapor stream issuing from a urea-to-melamine reactor comprising melamine vapor and impurities which comprises atmospherically contacting at least a portion of said vapor stream with an inert liquid hydrocarbon maintained at a temperature in the range of about 180°–356° C., and recovering so-produced solid melamine from said inert hydrocarbon stream.

10. The process according to claim 9 in which said temperature is in the range of about 200°–275° C.

References Cited in the file of this patent

UNITED STATES PATENTS

| | | |
|---|---|---|
| 2,076,033 | Kniskern | Apr. 6, 1937 |
| 2,191,361 | Widmer et al. | Feb. 20, 1940 |
| 2,215,968 | Livingston | Sept. 24, 1940 |
| 2,566,230 | MacKay et al. | Aug. 28, 1951 |
| 2,583,013 | Patterson | Jan. 22, 1952 |
| 2,607,440 | Lewis | Aug. 19, 1952 |
| 2,675,890 | Frey et al. | Apr. 20, 1954 |
| 2,675,891 | Frey | Apr. 20, 1954 |